United States Patent [19]

Tanney

[11] 3,864,971

[45] Feb. 11, 1975

[54] APPARATUS FOR MEASURING THE VELOCITY OF A FLUID STREAM RELATIVE TO THE APPARATUS

[75] Inventor: John W. Tanney, Ottawa, Ontario, Canada

[73] Assignee: Canadian Patents and Development Limited, Ottawa, Province of Ontario, Canada

[22] Filed: Jan. 28, 1974

[21] Appl. No.: 437,759

Related U.S. Application Data

[63] Continuation-in-part of Ser. No. 221,226, Jan. 27, 1972, abandoned, which is a continuation-in-part of Ser. No. 835,084, June 20, 1969, abandoned.

[52] U.S. Cl. ............................................. 73/194 R
[51] Int. Cl. .............................................. G01f 1/00
[58] Field of Search........... 73/194 R, 189; 137/803, 137/804

[56] References Cited
UNITED STATES PATENTS 3,686,937   8/1972   Corey............................... 73/194 R
3,705,534   12/1972  Turek................................. 73/189

Primary Examiner—Jerry W. Myracle
Attorney, Agent, or Firm—James R. Hughes; Francis W. Lemon

[57] ABSTRACT

A fluid velocity measuring apparatus wherein a fluid jet is directed from a nozzle along a portion of the flow path of a fluid stream whose velocity is to be measured, towards the open end of one or more receiver tubes. The nozzle and receiver tube or tubes have a turbulent jet forming space extending between them a distance of at least five times the minimum distance across the nozzle orifice, and the fluid pressure in the receiver tube or tubes is measured to determine the velocity of the fluid stream into which the jet is directed. The internal geometry of the fluid jet nozzle is derived from the jet Reynolds number which is in excess of 1,700 and the external geometry of the nozzle and/or receiver is defined to provide a substantially unobstructed flow path past the nozzle and receiver and substantially unrestrained interaction of the fluid stream with the jet.

7 Claims, 18 Drawing Figures

APPARATUS FOR MEASURING THE VELOCITY OF A FLUID STREAM RELATIVE TO THE APPARATUS

This is a Continuation-in-Part application of Application Ser. No. 221,226, filed Jan. 27, 1972, now abandoned, which was a Continuation-in-Part application of application Ser. No. 835,084, filed June 20, 1969, now abandoned.

This invention relates to an apparatus for measuring the velocity of a fluid stream relative to the apparatus.

There are many applications in which it is desirable to accurately measure the velocity of a fluid stream over a wide range of velocities. Present devices such as hot wires or hot film gauges and the pitot tubes suffer from having outputs that are not proportional to the measured velocity. Hot wires and films are delicate and require elaborate electronic equipment in their operation and the sensitivity of pitot tubes is dependent on the sensitivity of their associated pressure measuring apparatus, which generally limits their lower range of usefulness to 10 feet per second in air, except under specialized laboratory conditions. The use of rotating devices such as cup or propeller anemometers or their liquid counterparts provides an output proportional to the velocity of the measured stream but such instruments tend to stall at low velocities and their susceptibility or mechanical damage further limits their usefulness. Furthermore, such rotating devices, when designed to measure high fluid velocities, have very limited usefulness at low velocities and when designed to measure low velocities they are generally not useful or subject to damage at high velocities.

It is an object of the present invention to provide an apparatus for measuring the velocity of a fluid stream over a wider range of velocities than has been possible with known apparatus and to a greater accuracy than was possible with such apparatus.

It is a further object of the present invention to provide an apparatus, for measuring the velocity of a fluid stream, that is rugged and is substantially insensitive to its environment without being insensitive to the velocity of the fluid in such environment.

A further object of the present invention is to measure the direction in which a fluid stream is flowing by measuring the components of velocity of the fluid stream in one plane or in mutually crossing planes.

According to the present invention there is provided an apparatus for measuring the velocity of a fluid stream relative to the apparatus, comprising:

a. a fluid jet forming device having a fluid jet orifice,
b. a pressurized fluid source connected to the device to deliver a fluid thereto and cause a turbulent jet of fluid to issue from the orifice along a portion of the flow path of the fluid stream,
c. a receiver means including a receiver mouth facing the orifice, to be pressurized by the dynamic pressure of combined flows from the orifice and the fluid stream, within the area bounded by the receiver mouth,
d. means mounting the receiver means and the device with a turbulent jet forming space extending between them a distance of at least five times the minimum distance across the orifice, and
e. indicating means connected to the receiver means for indicating, in terms of the fluid pressure therein, the velocity of the fluid stream, and wherein, f. the geometry of the fluid jet orifice is derived from
$R = V h_n K/\mu$ where, in consistent dimensions
R is the dimensionless Reynolds number and is in excess of 1,700,
V is the velocity of the fluid issuing from the orifice,
K is the density of the fluid issuing from the orifice,
$\mu$ is the viscosity of the fluid issuing from the orifice, and
$h_n$ is the hydraulic diameter obtained from,
$h_n = 4 A_n/P_n$ where, in consistent dimensions,
$A_n$ is the cross-sectional area of the fluid jet orifice at the outlet, and
$P_n$ is the distance around the perimeter of the fluid jet orifice at the outlet, and
g. at least the one of the device and receiver to face downstream of the fluid stream has an external geometry as hereinafter defined.

When the fluid jet forming device is facing downstream its external geometry is defined, to provide a substantially unobstructed flow path past the fluid jet forming device and to allow substantially unrestrained interaction of the turbulent jet of fluid with the fluid stream, by its external perimeter enclosing a cross-sectional area less than $A_{on}$ between the limits of a plane located at the outlet of the orifice and a plane parallel thereto located 2 $h_n$ therefrom, where $h_n$ is the hydraulic diameter previously defined, and $A_{on}$ is derived from
$A_{on} = \pi (2.3 h_n + Y_n)^2/4$ where, in consistent dimensions,
$Y_n$ is the distance between the plane at the outlet of the orifice and the plane at which $A_{on}$ is to be defined.

When the receiver means is facing downstream of the fluid stream its external geometry is defined, to provide a substantially unobstructed flow path past the receiver means and to allow substantially unrestrained interaction of the turbulent jet of fluid with the fluid stream, by its external perimeter enclosing a cross-sectional area less than $A_{or}$ between the limits of a plane located at the inlet of the receiver mouth and a plane parallel thereto, by
$A_{or} = \pi (3 h_r + Y_r)^2/4$ where, within the limit of $Y_r$ is less than 2 $h_r$,
$Y_r$ is the distance from the plane at the receiver mouth to the plane at which $A_{or}$ is to be defined,
$h_r$ is the hydraulic diameter of the receiver mouth at its inlet as defined by the relationship
$h_r = 4 A_r/P_r$, where
$A_r$ is the area enclosed by the receiver mouth at its inlet, and
$P_r$ is the perimeter of the receiver mouth at its inlet.

In the accompanying drawings, which illustrate by way of example, embodiments of the present invention, FIG. 1 is a diagrammatic sectional side view of an apparatus for measuring the velocity of a fluid stream relative to the apparatus, FIG. 2 is a graph of the fluid pressure in the receiver mouth, of the apparatus shown in FIG. 1 plotted against the velocity of a fluid stream, and a similar graph for a pitot tube, FIG. 3 is a graph showing the fluid pressures in the receiver mouth, of the apparatus shown in FIG. 2, plotted against the velocity of a fluid stream, for different distances between the fluid jet forming device and the receiver, FIG. 4 is a diagrammatic sectional side view of a similar fluid jet forming device and receiver to that shown in FIG. 1 except that the fluid jet forming device issues a jet in the opposite direction to the direction of flow of said fluid stream, FIG. 5 is a side view of an apparatus for measuring the velocity of a fluid stream, with the fluid jet forming device and the receiver means mounted in means to support and space them, FIG. 6 is a sectional end view along VI—VI, FIG. 5, FIG. 7 is a sectional end view, similar to FIG. 6 of a different support housing, FIG. 8 is a sectional end view, similar to FIG. 6, of a different support housing, FIG. 9 is a sectional side view of a fluid jet forming device and a receiver means, both mounted in a fluid permeable casing, and for use as a comparator with the apparatus shown in FIGS. 1 through 8, FIG. 10 is a sectional side view of a fluid jet forming device and a receiver means, both mounted in a cup-shaped shielding, and for use as a comparator with the apparatus shown in FIGS. 1 through 8, FIG. 11 is a sectional side view of a fluid jet forming device and a receiver means, both mounted in a tube-shaped shielding, FIG. 12 is a sectional side view of a fluid jet forming device and two receiver means, and FIG. 13 is a perspective view of a fluid jet forming device and four receiver means, FIG. 14 is a graph showing the fluid pressure in the receiver mouth of the apparatus shown in FIG. 1, plotted against the velocity of a fluid stream, for different distances between the fluid jet forming device and the receiver mouth, FIG. 15 is a graph showing the fluid pressure in the receiver mouth of the apparatus shown in FIG. 2 plotted against the velocity of a fluid stream, for different distances between the fluid jet forming device and the receiver mouth, FIG. 16 is a sectional side view of a circular jet forming device.

Figure 1:
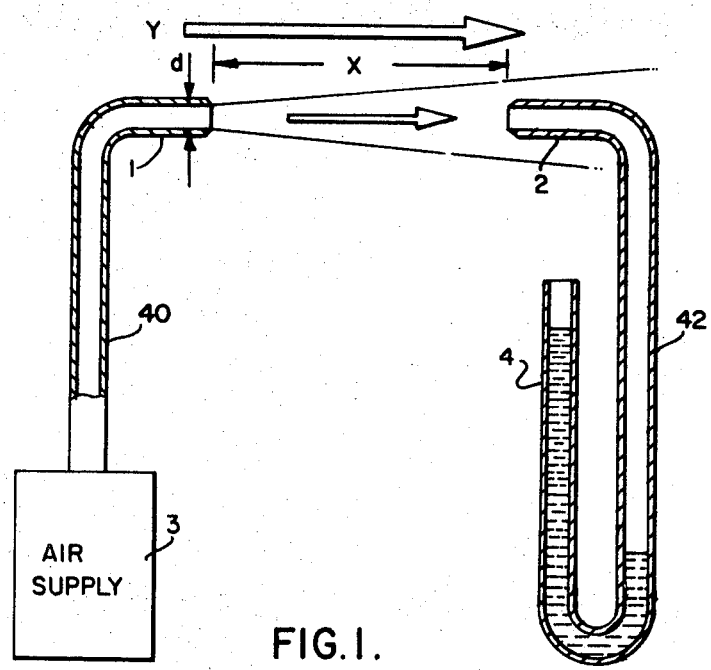

In FIG. 1 there is shown a fluid jet forming device in the form of a nozzle 1, having a fluid jet orifice, a pressurized fluid source in the form of an air supply 3 connected to the nozzle 1 to deliver a fluid thereto and cause a turbulent jet of fluid to issue from the orifice along a portion of a flow path of a fluid stream flowing in the direction of arrow Y. A receiver means in the form of a tube 2 including a receiver mouth facing the orifice of the nozzle 1 to be pressurized, by the dynamic pressure of combined flows from the orifice and the fluid stream flowing in the direction of arrow X, within the area bounded by the receiver mouth. Means mounting the tube 2 and the nozzle 1, in the form of tubular extensions 40 and 42 attaching the nozzle 1 and tube 2 to the air supply 3 and a manometer 4, with a turbulent jet forming space extending between them a distance X of at 5 times the minimum distance across the orifice of the nozzle 1. The manometer 4 is an indicating means connected to the tube 2 for indicating, in terms of the fluid pressure therein, the velocity of the fluid stream.

The geometry of the fluid jet orifice of the nozzle 1 is derived from $R = Vh_nK/\mu$ where, in consistent dimensions, R is the dimensionless Reynolds number and in excess of 1,700, V is the velocity of the fluid issuing from the orifice, K is the density of the fluid issuing from the orifice, $\mu$ is the viscosity of the fluid issuing from the orifice, and $h_n$ is the hydraulic diameter obtained from, $h_n = 4A_n/P_n$ where, in consistent dimensions, $A_n$ is the cross-sectional area of the fluid jet orifice at the outlet, and $P_n$ is the distance around the perimeter of the fluid jet orifice at the outlet.

The velocity V of said supply fluid at the outlet of the orifice of the nozzle 1 may be determined experimentally or may be derived, for a given geometry of the apparatus, pressure of the pressurized fluid source, and supply fluid, from published texts.

When the nozzle 1 faces downstream to the direction of the flow Y of the fluid stream the external geometry of the nozzle 1 is defined, to provide a substantially unobstructed flow path past the nozzle and to allow substantially unrestrained interaction of the turbulent jet of fluid with the fluid stream by its external perimeter, in a plane parallel to the plane of the outlet of the orifice, enclosing an area less than $A_{on}$ between the limits of the plane of the outlet of the orifice and a parallel plane located two times $h_n$ from the plane of the outlet of the orifice, where $h_n$ is the hydraulic diameter of the jet forming orifice, as previously defined, $Y_n$ is the distance between the plane of the outlet of the orifice and the plane at which $A_{on}$ is determined, and $A_{on}$ is derived from $A_{on} = \pi (2.3 h_n + Y_n)^2/4$ In this specification "turbulent jet forming space" is defined as a space in which the turbulent jet is allowed to expand in a manner similar to the expansion of a turbulent jet in a volume which is substantially unbounded.

In operation the apparatus was arranged as shown in FIG. 1, with the nozzle 1 and receiver 2 mounted in the fluid stream whose velocity is to be measured. The apparatus was arranged with a range of values for the distance X equal to or greater than the five times the minimum distance across the fluid jet orifice of the nozzle 1, which in this case was the diameter $d$. A turbulent jet of air was directed from the nozzle towards the receiver tube 2.

The turbulent jet is defined in relation to FIG. 1 as being approximately conical in form when produced by a circular jet forming orifice and having a virtual origin on its axis approximately 5 diameters upstream of the plane of exit of the flow from the jet forming device, when surrounded by a quiescent atmosphere, and is clearly distinguished from what is known as laminar flow, in which the streamlines are essentially parallel as described by Mott in U.S. Pat. No. 3,429,323, dated Feb. 25, 1969.

Figure 2:
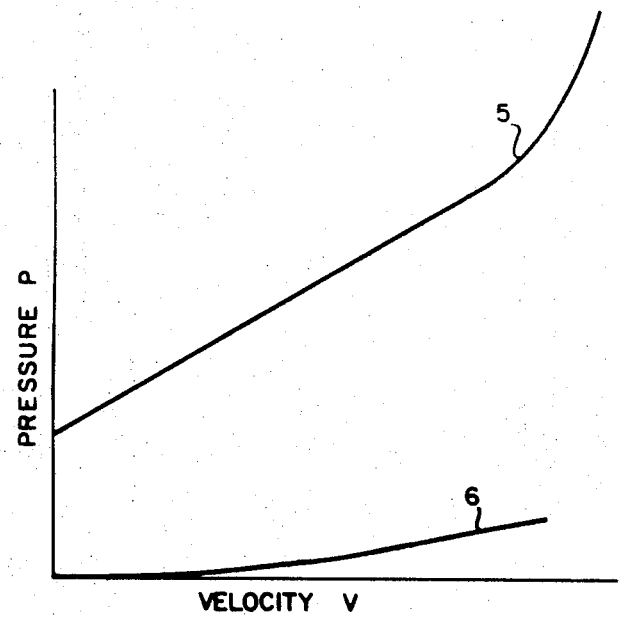

Readings of the air pressure P within the tube 2 were taken for different velocities V of the stream of air in the direction of arrow Y, and the results were plotted to obtain the graph 5, FIG. 2. Similar readings were taken using a Pitot tube and manometer and these were plotted to obtain the graph 6. It will be seen from FIG. 2 that the major part of the graph 5 indicates a linear relationship between the pressure in the tube 2 and the velocity of the air stream flowing in the direction of arrow Y. The graph 6 indicates a square law relationship between the pressure obtained from a Pitot tube and manometer and the velocity of an air stream to be measured. Thus the apparatus shown in FIG. 1 has considerable advantage in terms of sensitivity and linearity when compared with a Pitot tube.

Figure 3:
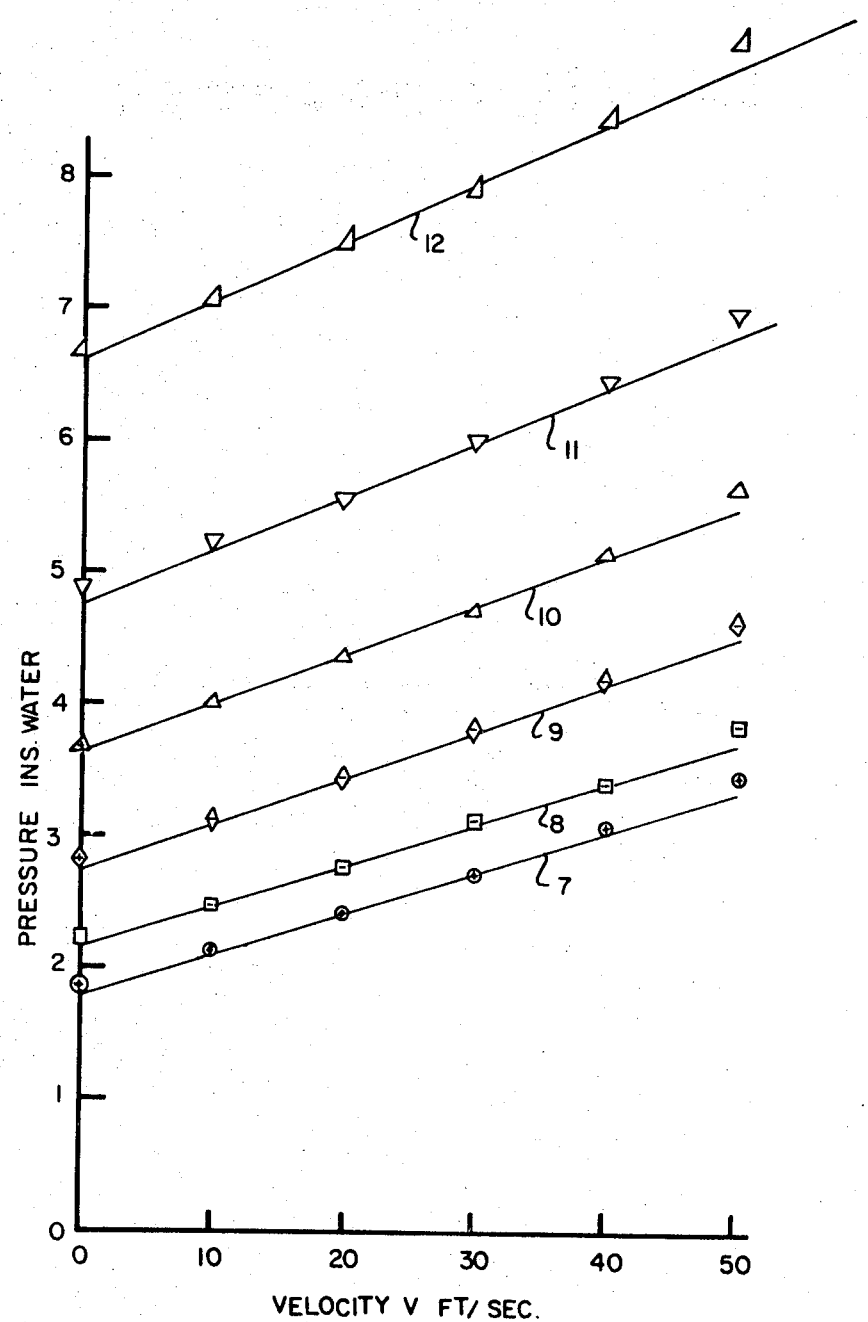

In FIG. 3 the apparatus shown in FIG. 1 was used for different lengths of $x$. The pressure P is the tube 2 was recorded in inches of water for different velocities of the air stream in the direction of arrow Y, in feet per second. The air supply pressure from air supply 3 was 15 P.S.I.G., and the diameter $d$ was 0.187 inches. For the various graphs shown on FIG. 3, for 7, $x = 5.5$ inches, for 8, $x = 5.0$ inches, for 9, $x = 4.5$ inches, for 10, $x = 4.0$ inches, for 11, $x = 3.5$ inches, for 12 $x = 3.0$ inches. It well be appreciated that under different experimental conditions, different graphs may be obtained.

Figure 14:
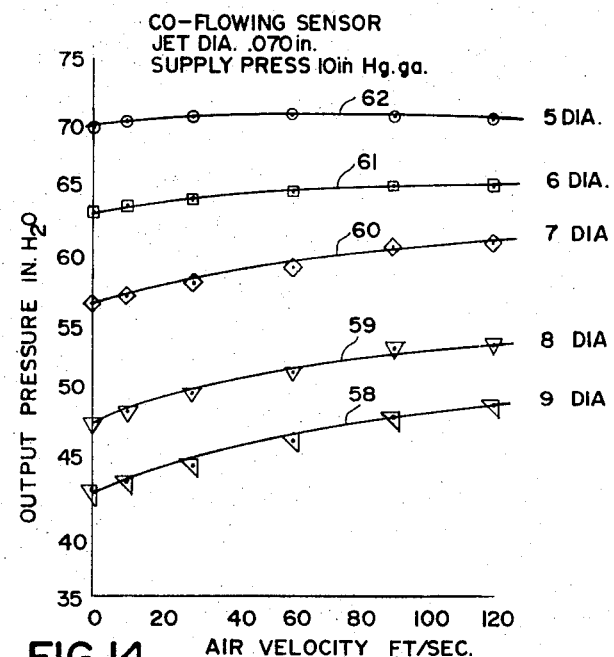

In FIG. 14 graphs are shown of the pressure in the tube 2 plotted against the velocity of the fluid stream using an apparatus similar to that shown in FIG. 1 with various lengths $x$. The pressure in the tube 2 was recorded in inches of water for different velocities of the air stream in the direction of the arrow Y in feet per second. The air supply pressure from air supply 3 was equal to 10 inches of mercury head relative to the ambient pressure and the diameter $d$ of the nozzle orifice was 0.07 inches. For the various graphs shown on FIG. 14 for 58, $X = 9d$, for 59, $X = 8d$, for 60, $X = 7d$, for 61, $X = 6d$, for 62, $X = 5d$. At nozzle orifice to receiver mouth spacings of less than $X = 5d$ the sensitivity of the output pressure to incremental changes in the velocity of the fluid stream is indicated to be such that the apparatus is not useful for the measurement of the velocity of a fluid stream.

Figure 15:
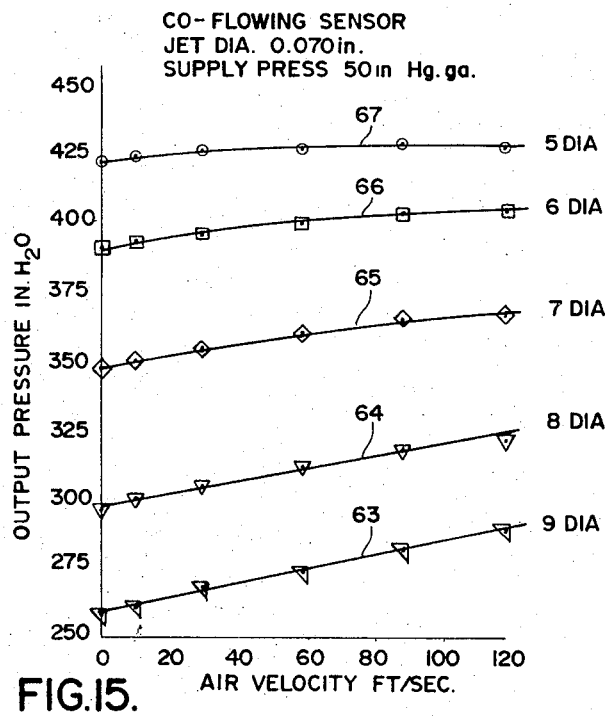

In FIG. 15 an apparatus similar to that shown in FIG. 1 was used for different lengths X. The pressure in the tube 2 was recorded in inches of water for different velocities of the air stream in the direction of arrow Y, in feet per second. The air supply pressure from air supply 3 was equal to 50 inches of mercury head relative to the ambient pressure and the diameter $d$ of the nozzle orifice was 0.07 inches. For the various graphs shown on FIG. 18, for 63, $X = 9d$, for 64, $X = 8d$, for 65, $X = 7d$, for 66, $X = 6d$, for 67, $X = 5d$ the sensitivity of the output pressure to incremental changes in the velocity of the fluid stream is such that the apparatus is not useful for the measurement of the velocity of a fluid stream.

Figure 4:
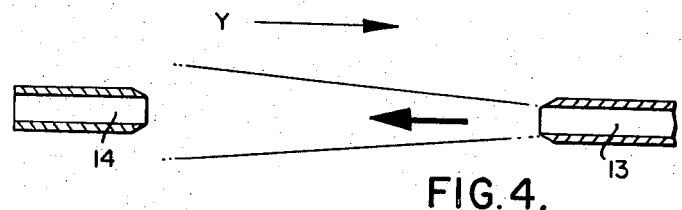

In FIG. 4 there is shown a nozzle 13 and tube 14 of an apparatus similar to the apparatus shown in FIG. 1, except that the nozzle 13 is disposed to emit a fluid jet in the opposite direction to the flow Y of the fluid stream, that is, the mouth of the tube 14 forming the receiver means faces downstream of the fluid stream flowing in the direction of arrow Y. This arrangement has been shown to provide a suitable apparatus for measuring the velocity of a fluid stream.

In this embodiment the geometry of the fluid jet orifice is also defined in terms of the Reynolds number R being in excess of 1,700 by the relationship $R = Vh_p/\mu$, and in accordance with the nomenclature previously defined in this specification.

The external geometry of the receiver means with the mouth of the tube 14 facing downstream of the fluid stream flowing in the direction of arrow Y is defined to provide a substantially unobstructed flow path past the tube 14 and to allow substantially unrestrained mixing of the jet with the fluid stream by being such that the maximum area enclosed by the outer perimeter of the receiver means in a plane parallel to the plane of the receiver mouth is less than $A_{or}$ as defined by the relationship $A_{or} = \pi (3h_r + Y_r)^2/4$ where within the limit of $Y_r$ being less than $2h_r$ $Y_r$ is the distance from the plane of the receiver mouth to the plane at which $A_{or}$ is determined $h_r$ is the hydraulic diameter of the receiver mouth at its inlet as defined by the relationship $h_r = 4A_r/P_r$ where $A_r =$ is the area enclosed by the receiver mouth at its inlet, and, $P_r =$ is the perimeter of the receiver mouth at its inlet The nozzle 13 is disposed to emit a turbulent fluid jet in a direction opposite to the direction of the flow Y of the fluid stream. Incremental increases in the velocity of the velocity of the fluid stream produce a decrease in the pressure in the receiver 14.

Figure 5:
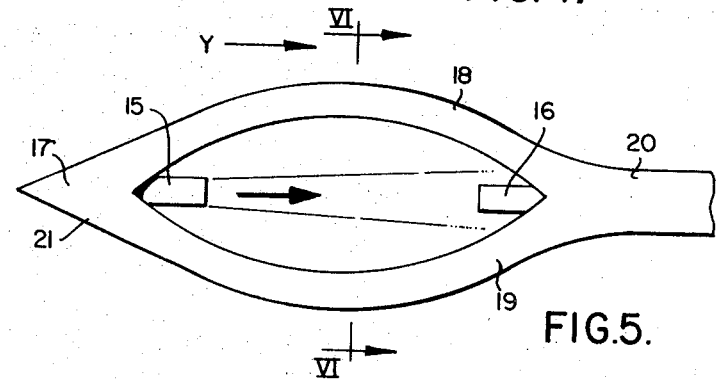
Figure 6:
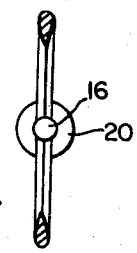

In FIGS. 5 and 6 there is shown a nozzle 15 and a tube 16 similar to those shown in the apparatus shown in FIG. 1, except that these elements are mounted in means to support and space them in the form of a support housing 17. The support housing comprises two arms 18 and 19 which diverge from a circular cross-sectioned portion 20, containing the tube 16, and converge to a portion 21 around the nozzle 15. This apparatus measures the velocity of a fluid stream in the direction of arrow Y in a similar manner to that of the apparatus shown in FIG. 1 or FIG. 4.

Figure 7:
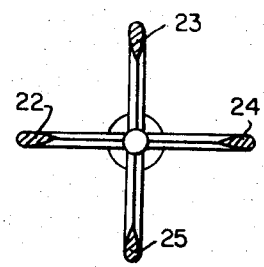

In FIG. 7 a housing, similar to that shown in FIGS. 5 and 6, is shown but having four arms 22, 23, 24, and 25.

Figure 8:
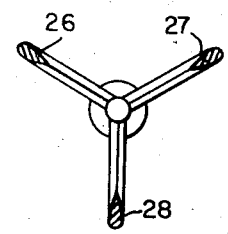

In FIG. 8 a housing, similar to that shown in FIGS. 5 and 6, is shown but having three arms 26, 27 and 28.

Figure 9:
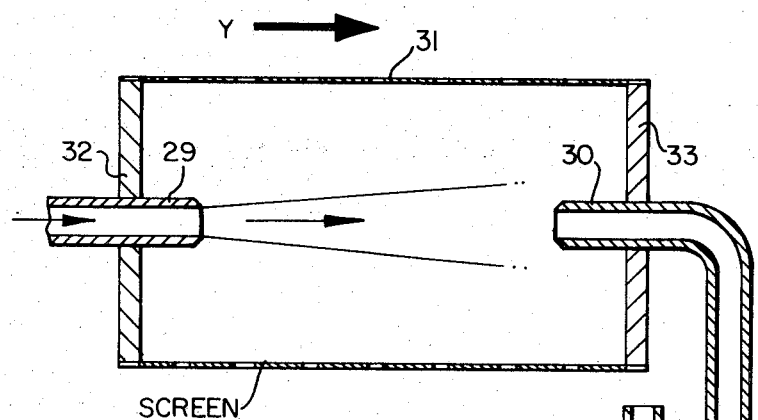
Figure 9:
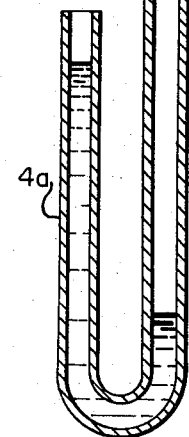

In FIG. 9 a receiver means or tube 30 having a receiver mouth and a nozzle 29 having a fluid jet orifice are disposed within a permeable casing in the form of a cylindrical mesh screen casing 31 supported by disc shaped ends 32 and 33. The geometry of the fluid jet orifice is defined in terms of the Reynolds number being in excess of 1,700 by the relationship $R = Vh K/\mu$ and in accordance with the nomenclature previously defined in this specification. With the apparatus described with reference to FIGS. 1 to 8, a biased output, pressure P from the receiver means (tube 2 in FIG. 1) is obtained, that is, the output pressure P is not zero with no fluid stream flowing. This bias is a function of the distance $x$ (FIG. 1) and the air flow from the nozzle 1 (FIG. 1) or 13 (FIG. 14) air flow from the nozzle 1 (FIG. 1) or 13 (FIG. 4) will cause a variation in the pressure P independantly of a particular velocity V because the jet from the nozzle 29 is restrained from interacting with the fluid stream by the cylindrical mesh screen 31 and the disc-shaped ends 32 and 33 and as a result interacts only with fluid introduced into the casing through nozzle 29.

As already stated the apparatus shown in FIG. 9 is shown to provide a comparator apparatus for the apparatus shown in FIGS. 1 or 4, wherein the pressure P is substantially unaffected by the fluid stream whose velocity is to be measured. Thus comparing the pressure P of this apparatus with the pressure P of the apparatus shown in either of FIGS. 1 or 4, with both apparatus coupled to the same air supply 3 (FIG. 1) so that the fluid pressure from both fluid jets is substantially the same will provide a compensation for changes in the air pressure from the air supply 3. In this sense the nozzle 29 is a second nozzle and the tube 30 is a second tube, that is, a manometer 4a is connected to the tube 30. In other embodiments a different fluid permeable casing to the mesh screen 31 may be used, for example, a perforated sheet metal cylinder may be used supported by disc-shaped ends 32 and 33.

Figure 10:
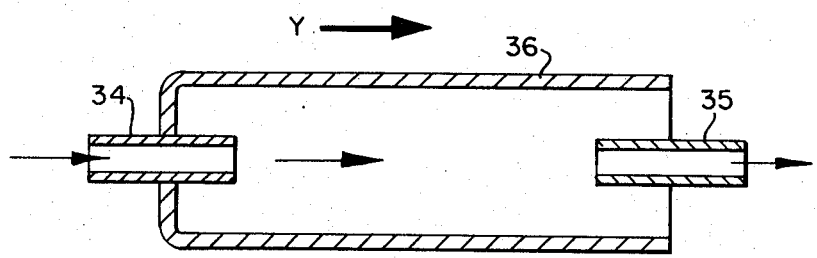

A different comparator to that shown in FIG. 9 is shown in FIG. 10, comprising a nozzle 34 and tube 35, similar to those shown in FIG. 1, disposed within a cup-shaped shield 36. The cup-shaped shield 36 substantially limits the jet to interacting with fluid introduced into the shield 36 through the nozzle 34 and restricts jet interaction with the fluid stream Y. The magnitude of the pressure P in receiver means 35 is therefore substantially dependent upon the supply pressure of the air supply 3 (FIG. 1).

From this it will be seen that the cup-shaped shield 36 has a similar effect to that of the screen casing 31 (FIG. 9) and the disc-shaped ends 32 and 33, and is used in the same manner with the apparatus shown in FIG. 1.

Figure 11:
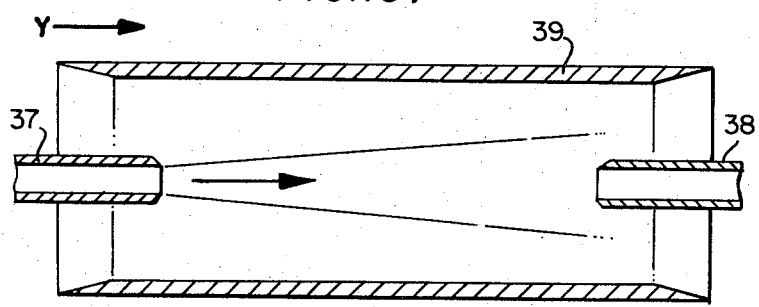

In FIG. 11 a nozzle 37 and a tube 38, similar to those shown in either of FIGS. 1 and 4 are disposed within a cylindrical shield 39 of a configuration which is open at both ends and which does not allow attachment of the jet from the nozzle to such shield by its internal surface in the region of the jet being such that the hydraulic diameter $h_s$ of such surface is defined by the relationship $h_s > 0.3$ L, where L is the distance from the plane of the exit of the nozzle orifice and any plane at which the hydraulic diameter of the inner surface of the shield is determined within the limits that L is greater than 5 $h_n$ and less than X, $h_n$ being in accordance with the nomenclature previously defined in this specification and x as is illustrated in FIG. 1. The shield 39 has the effect of directing at least a portion of the stream of air whose velocity is to be measured along the same flow path and in the same or opposite direction as the fluid jet issuing from the nozzle 37. Thus any effect on the relationship of P with respect to V due to the fluid jet, issuing from the nozzle 37, from inadvertently being directed along a sloping path to the direction of the stream of air, whose velocity is to be measured, is substantially reduced. If desired the shield may only contain one of the members selected from the group comprising the nozzle 37 or the tube 38.

The length of the cylindrical shield 39 may be within the limits L = $5h_n$ and X or may extend in one or both directions beyond these limits, in fact the cylindrical shield 39 may even be an elongated pipe or duct with or without bends for conveying the fluid stream from a source of the fluid to a position at which it is to be utilized.

Figure 12:
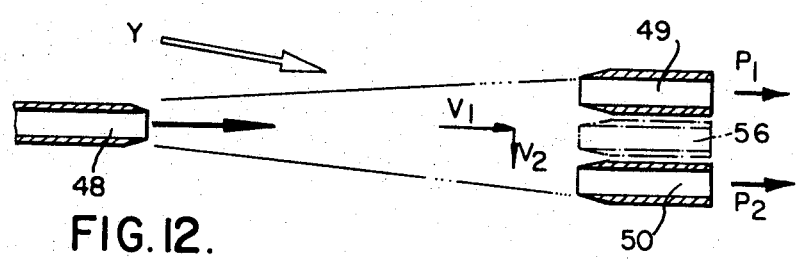

In FIG. 12 a nozzle 48 with internal and external geometry defined in the same manner as the nozzle 1 in FIG. 1 is provided with two receiver means in the form of two tubes 49 and 50. Assuming Y is the direction of flow of the fluid stream to be measured, the pressure in the tube 49 is $P_1$, and the pressure in the tube 50 is $P_2$ then $P_1 + P_2 \infty V_l$ where $V_2$ is the component of the velocity of the fluid stream in the direction of the jet from the nozzle 48, and $P_1 - P_2 \infty V_2$ where $V_2$ is the component of the velocity of the fluid stream in a transverse direction to the jet from the nozzle 48, and in a plane extending through the longitudinal axis of the tubes 49 and 50.

From the above it will be seen that the velocity and direction (in one plane) of the fluid stream can be calculated using the apparatus shown in FIG. 15.

In some instances it may be advantageous to have a central receiver means in the form of a tube 56 (shown chain-dotted) to improve the accuracy in measuring the longitudinal component of the velocity of the fluid stream $V_1$.

Figure 13:
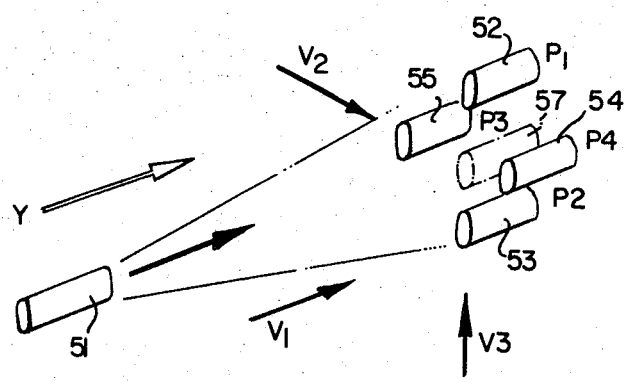

In FIG. 13 a nozzle 51 similar to that shown in FIG. 15 and with internal and external geometry defined in the same manner as the nozzle 1 in FIG. 1 is provided with four receivers in the form of tubes 52, 53, 54 and 55. Using this apparatus in the same manner as the apparatus shown in FIG. 12, the direction of the fluid stream may also be determined in a plane at right angles to the directions obtainable from the apparatus shown in FIG. 12.

In some instances it may be advantageous to have a central receiver means, in the form of a tube 57 (shown chain-dotted), to improve the accuracy in measuring the longitudinal component of the velocity of the fluid stream $V_1$.

Figure 16:
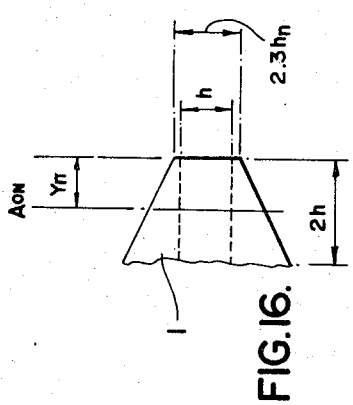

FIG. 16 illustrates the limitation of the external geometry of the nozzle 1 with respect to FIG. 1 and other embodiments of the invention in which the fluid stream is flowing in substantially the same direction as the jet from the nozzle orifice. The outline of the nozzle 1 shown in FIG. 16 illustrates a nozzle 1 with a circular jet orifice and external geometry defined in accordance with the relationship $A_{on} = \pi(2.3\ h_n + Y_n)^2/4$ where the nomenclature is as has been previously defined. The shape of the external surface of the nozzle 1 would be somewhat different for the same relationship with a different shaped orifice such as an oval, square, or rectangular shape.

Figure 17:
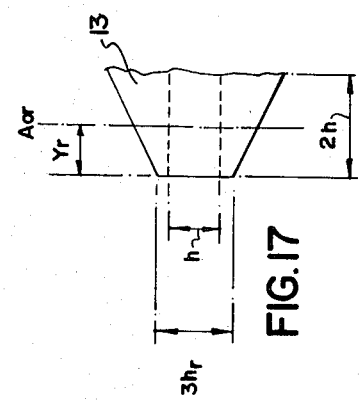
FIG. 17 is a sectional side view of a circular receiver means.

FIG. 17 illustrates the limitation of the external geometry of the receiver 13 with respect to FIG. 4 and other embodiments of the invention in which the fluid stream is flowing in substantially the opposite direction to the jet from the nozzle orifice. The outline of the receiver 13 shown in FIG. 20 illustrates a receiver with a circular mouth and external geometry defined in accordance with the relationship $A_{or} = \pi (3h_r + Y_r)^2/4$ where the nomenclature is as has been previously defined. The shape of the external surface of the receiver 13 would be somewhat different for the same relationship with a different shaped mouth such as an oval, square or rectangular shape.

Figure 18:
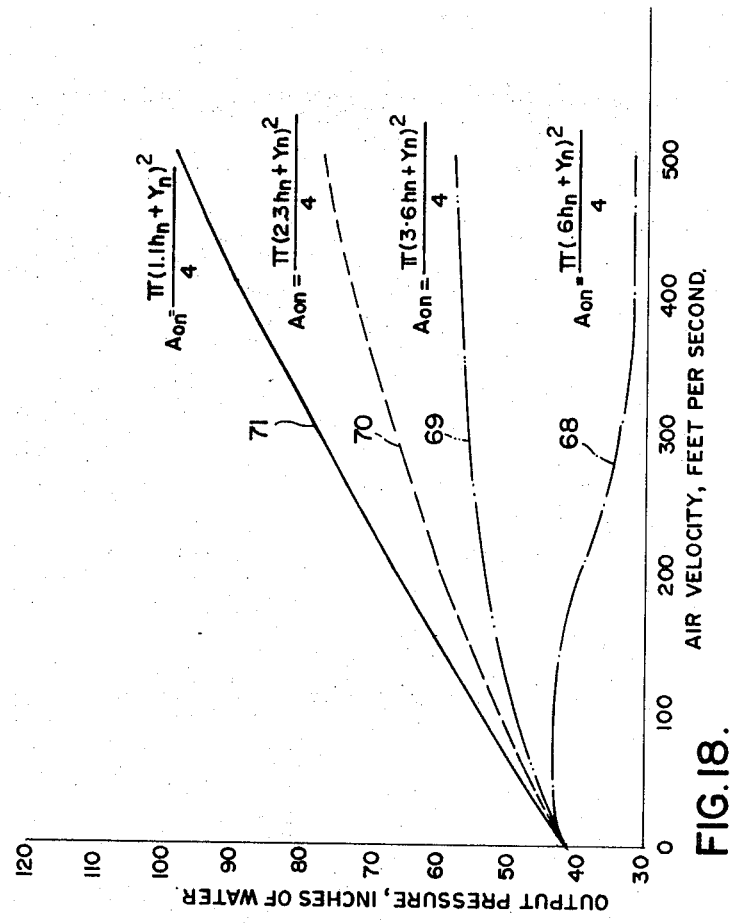
FIG. 18 is a graph illustrating the performance of the apparatus shown in FIG. 1 using various shaped nozzles.

FIG. 18 illustrates the performance of various nozzles ranging from one that exceeds the limits of dimensions specified with reference to FIGS. 1 to 16 to one that falls fully within such limits. For the various graphs shown in FIG. 18, for 68 the nozzle used was a flat ended tube; going through 69 and 70 for tapering nozzles to 71 for a sharpened nozzle, to verify the limits defined with reference of FIG. 1 and 19. The use of a nozzle having an external geometry outside of such defined limits provides an output pressure sensitivity that is not linear with the velocity of the fluid stream, is ambiguous, and is such that the apparatus is not useful for measurement of the velocity of a fluid stream. The external geometry of the receiver, when facing downstream of the fluid stream, was similarly verified.

In a further embodiment of the invention wherein the fluid stream, whose velocity is measured, may flow substantially in the direction shown in FIG. 1 or substantially in the direction shown in FIG. 4, a nozzle 1 as described with reference to FIG. 1 is used, and a receiver 13 as described with reference to FIG. 4 is used both defined by the relationships and nomenclature previously stated.

In this specification the fluid from the pressurized fluid source and the fluid stream may be either liquid or gases or mixtures of any two or more of liquids, gases and solids.

Further in this specification the fluid stream is a flow of fluid in a bounded or essentially unbounded volume which is moved by a propelling means such as a pump, fan or similar device or by natural forces such as are present in the atmosphere or the oceans. Further, such fluid stream may be the velocity of the fluid relative to various embodiments of the invention as have been described when such embodiments are moved through a stationary or moving fluid by a transporting device such as a tracked or free vehicle. Such vehicle could be a mechanical drive to move the embodiment through a tank of fluid, an automotive vehicle, a ship, a submarine, or an aeroplane.

In this specification the phrase "to cause a jet of fluid to issue from said orifice along a portion of the flow path of said fluid stream" is intended to include:
1. the case where the jet and fluid stream are along the same axis and flow in the same direction.
2. the case where the jet and fluid stream are along the same axis and flow in the opposite direction,
3. the case where the jet and fluid stream are along paths which slope with respect to one another and cross and flow in the same direction, and
4. the case where the jet and fluid stream are along paths which slope with respect to one another and cross and flow in opposite directions.

In all of the embodiments described above it was found that the apparatus was unreliable if the inlet end of the receiver mouth was at a distance of less than five times the minimum distance across the nozzle orifice, from the outlet end of the nozzle orifice.

Changes in the fluid pressure in the receiver may be interpreted by changes in fluid flow in the receiver instead of by, or in combination with, actual changes of fluid pressure within the receiver.

It will be appreciated that all of the embodiments of the invention described with reference to FIGS. 1 to 21 may, if desired, have the fluid jet forming device and the receiver means mounted to be movable relative to one another to adjust the distance between the outlet end of the orifice and the inlet end of the receiver means to a desired setting.

I claim:
1. Apparatus for measuring the velocity of a fluid stream relative to the apparatus, comprising:
   a. a fluid jet forming device having a fluid jet orifice,
   b. a pressurized fluid source, connected to the device to deliver a fluid thereto of known density and viscosity and cause a turbulent jet of fluid to issue from the orifice at a predetermined velocity along a portion of the flow path of the fluid stream,
   c. a receiver means including a receiver mouth facing the orifice, to be pressurized by the dynamic pressure of combined flows from the orifice and the fluid stream, within the area bounded by the receiver mouth,
   d. means mounting the receiver means and the device with a turbulent jet forming space extending between them a distance of at least five times the minimum distance across the orifice, and
   e. indicating means connected to the receiver means for indicating, in terms of the fluid pressure therein, the velocity of the fluid stream, and wherein,
   f. the geometry of the fluid jet orifice is derived from $R = Vh_n K/\mu$ where, in consistent dimensions
      R is the dimensionless Reynolds number and is in excess of 1,700,
      V is the velocity of the fluid issuing from the orifice,
      K is the density of the fluid issuing from the orifice,
      $\mu$ is the viscosity of the fluid issuing from the orifice and,
      $h_n$ is the hydraulic diameter obtained from
      $h_n = 4A_n/P_n$ where, in consistent dimensions,
      $A_n$ is the cross-sectional area of the fluid jet orifice at the outlet, and
      $P_n$ is the distance around the perimeter of the fluid jet orifice at the outlet, and,
   g. when the device is to face downstream of the fluid stream it has an external geometry defined by its external perimeter enclosing a cross-sectional area less than $A_{on}$ between the limits of a plane located at the outlet of the fluid jet orifice and at the plane parallel thereto located $2h_n$ therefrom, where $h_n$ is the hydraulic diameter previously defined, and $A_{on}$ is derived from
      $A_{on} = \pi (2.3 h_n + Y_n)^2/4$, where, in consistent dimensions,
      $Y_n$ is the distance between the plane at the outlet of the fluid jet orifice of the device and the plane at which $A_{on}$ is to be defined, and
   when the receiver means is to face downstream of the fluid stream it has an external geometry defined by its external perimeter enclosing a cross-sectional area less than $A_{or}$ between the limits of a plane located at the inlet of the receiver mouth and a plane parallel thereto, by
      $A_{or} = \pi (3h_r + Y_r)^2/4$, where, in consistent dimensions and within the limit of Y is less than $2h_r$,
      $Y_r$ is the distance from the plane at the receiver mouth to the plane at which $A_{or}$ is to be defined,
      $h_r$ is the hydraulic diameter of the receiver at its inlet as defined by the relationship
      $h_r = 4A_r/P_r$, where
      $A_r$ is the area enclosed by the receiver mouth at its inlet, and
      $P_r$ is the perimeter of the receiver mouth at its inlet.

2. Apparatus according to claim 1, wherein said fluid jet forming device is disposed to cause a jet of fluid to issue from said orifice with the same direction of movement as said fluid stream.

3. Apparatus according to claim 1, wherein said receiver means has a plurality of receiver mouths disposed around the longitudinal axis of said jet of fluid, and said means for indicating changes in the fluid pressure in said receiver mouth indicates the pressures in said receiver mouths.

4. Apparatus according to claim 1, which includes a cylindrical shield disposed around at least one of said fluid jet forming device and said receiver means, said shield extending along the direction of flow of the turbulent jet to receive at least a portion of said fluid stream and direct it along the same flow path and in the same direction, as said fluid jet.

5. Apparatus according to claim 1, which includes a cylindrical shield disposed around at least one of said fluid jet forming device and said receiver means, said shield being arranged to receive at least a portion of said fluid stream and direct it along the same flow path as, but in the opposite direction to, said fluid jet.

6. Apparatus according to claim 1, wherein said fluid jet forming device and said receiver means are a first fluid jet forming device and a first receiver means, and which includes a comparator comprising a second fluid jet forming device having a fluid jet orifice and similar to the first fluid jet forming device, a pressurized fluid source connected to said second device to cause a jet of fluid to issue from said orifice of said second device along a path remote from said fluid stream and at substantially the same pressure as the jet of fluid from said first device, a second receiver means similar to the first receiver means and including a receiver mouth facing said orifice of said second device for having fluid pressure imposed therein by said jet, a casing having an outlet for said fluid from said second jet and mounting said second receiver means and said second receiver mouth at said distance of at least five times the minimum distance across said second orifice, from the outlet end of said second orifice, and means connected to said first and second receiver means for indicating changes in the fluid pressure differential between said first and second receiver mouths.

7. Apparatus according to claim 6, comprising a fluid permeable casing, and wherein said second fluid jet forming device and said second receiver means are disposed within said fluid permeable casing.

* * * * *